(12) United States Patent
Scheick et al.

(10) Patent No.: US 11,407,436 B2
(45) Date of Patent: Aug. 9, 2022

(54) STEERING WHEEL WITH FIXED CENTER

(71) Applicant: Byton North America Corporation, Santa Clara, CA (US)

(72) Inventors: John Scheick, Mountain View, CA (US); Damian Harty, Hayward, CA (US); Zachary Walker, Mountain View, CA (US); Chris Eckert, San Jose, CA (US)

(*) Notice: Subject to any disclaimer, the term of this patent is extended or adjusted under 35 U.S.C. 154(b) by 0 days.

(21) Appl. No.: 16/292,184

(22) Filed: Mar. 4, 2019

(65) Prior Publication Data
US 2020/0283052 A1   Sep. 10, 2020

(51) Int. Cl.
*B62D 1/00* (2006.01)
*B62D 1/10* (2006.01)
(Continued)

(52) U.S. Cl.
CPC .............. *B62D 1/105* (2013.01); *B62D 1/046* (2013.01); *B62D 1/16* (2013.01); *B62D 3/12* (2013.01)

(58) Field of Classification Search
CPC .......... B62D 1/105; B62D 1/046; B62D 1/16; B62D 3/12; F16H 55/18; F16H 2057/121; F16H 2057/126; F16H 2057/127
See application file for complete search history.

(56) References Cited

U.S. PATENT DOCUMENTS 3,543,874 A * 12/1970 Nevett ................. B60K 37/00
                                                    180/78
3,548,673 A * 12/1970 Suchocki .......... F16H 57/02004
                                                    74/409
(Continued)

FOREIGN PATENT DOCUMENTS

CN    102616184 A    8/2012
CN    106828584 A    6/2017
(Continued)

OTHER PUBLICATIONS

Debord, Matthew, "The Tesla Model 3 has the most minimalistic interior I've ever seen", BusinessInsider.com, Available Online at <https://www.businessinsider.com/tesla-model-3-minimalistic-interior-2017-7>, Jul. 29, 2017, 18 pages.
(Continued)

*Primary Examiner* — Nictor L MacArthur
(74) *Attorney, Agent, or Firm* — Womble Bond Dickinson (US) LLP

(57) ABSTRACT

Embodiments are disclosed of an apparatus including a housing. A column gear is positioned within the housing and adapted to be coupled to a steering column, and the column gear has a first diameter, rotates about a first axis, and has teeth along its perimeter. A steering wheel gear is positioned within the housing and spaced apart from the column gear and adapted to be coupled to a steering wheel; the steering wheel gear has a second diameter, rotates about a stationary hub having a second axis, and has teeth along its perimeter. A transfer gear is positioned within the housing. The transfer gear rotates about a third axis, has teeth along its perimeter, and is positioned so that the teeth of the transfer gear engage the teeth of the column gear and the teeth of the steering wheel gear.

20 Claims, 5 Drawing Sheets

(51) Int. Cl.
*B62D 1/04* (2006.01)
*B62D 3/12* (2006.01)
*B62D 1/16* (2006.01)

(56) References Cited

U.S. PATENT DOCUMENTS

| | | |
|---|---|---|
| 3,669,465 A | 6/1972 | Vacante |
| 3,680,884 A | 8/1972 | Stephenson |
| 3,744,817 A | 7/1973 | Ousset |
| 4,369,668 A * | 1/1983 | Pollak-Banda ........ F04D 29/051 |
| | | 74/410 |
| 4,429,588 A * | 2/1984 | Emundts ................ B60K 37/02 |
| | | 280/775 |
| 4,561,324 A * | 12/1985 | Hiramitsu ............... B60K 35/00 |
| | | 475/339 |
| 4,572,313 A * | 2/1986 | Ono ........................ B62D 1/105 |
| | | 180/78 |
| 4,598,602 A * | 7/1986 | Kurata .................. B60R 16/027 |
| | | 74/484 R |
| 4,604,912 A * | 8/1986 | Sugita ..................... B60K 35/00 |
| | | 200/61.54 |
| 4,771,650 A * | 9/1988 | Kerner ................ B60R 21/2032 |
| | | 280/731 |
| 4,932,285 A | 6/1990 | Tsukamoto |
| 5,072,628 A * | 12/1991 | Oki ........................ B60K 35/00 |
| | | 74/484 R |
| 5,085,465 A | 2/1992 | Hieahim |
| D346,997 S | 5/1994 | Kurtis |
| D356,766 S | 3/1995 | Lai |
| 5,609,356 A | 3/1997 | Mossi |
| 5,722,686 A | 3/1998 | Blackburn et al. |
| 5,887,494 A | 3/1999 | Papandreou |
| 5,893,580 A | 4/1999 | Hoagland et al. |
| 5,947,514 A | 9/1999 | Keller et al. |
| 6,189,919 B1 | 2/2001 | Sinnhuber et al. |
| 6,394,489 B1 | 5/2002 | Faigle et al. |
| 6,530,596 B2 | 3/2003 | Sinnhuber |
| D480,671 S | 10/2003 | Pfeiffer et al. |
| 6,976,703 B2 | 12/2005 | Holmes et al. |
| 6,997,076 B2 * | 2/2006 | Menjak .................. B62D 1/105 |
| | | 74/409 |
| 7,192,293 B2 * | 3/2007 | Wasalaski ............. B60R 16/027 |
| | | 439/164 |
| 7,287,618 B2 | 10/2007 | Okamoto et al. |
| 7,293,795 B2 | 11/2007 | Kong |
| 7,296,795 B2 | 11/2007 | Kawasaki |
| 7,325,827 B2 | 2/2008 | Reiter et al. |
| D564,952 S | 3/2008 | Shinshima et al. |
| D564,953 S | 3/2008 | Tanaka |
| D571,697 S | 6/2008 | Maeda et al. |
| D592,114 S | 5/2009 | Tombazis |
| 7,669,494 B2 * | 3/2010 | Bader ................... F16H 37/043 |
| | | 475/331 |
| D622,195 S | 8/2010 | Lester |
| D625,233 S | 10/2010 | Mizuhata et al. |
| 7,931,296 B2 | 4/2011 | Choi |
| RE43,413 E | 5/2012 | Sinnhuber |
| D658,554 S | 5/2012 | Tasaki et al. |
| D670,628 S | 11/2012 | Tasaki et al. |
| D696,994 S | 1/2014 | Tanaka et al. |
| D696,997 S | 1/2014 | Higashikawa |
| D705,142 S | 5/2014 | Yamamoto et al. |
| D705,144 S | 5/2014 | Ishikawa et al. |
| D705,145 S | 5/2014 | Mangan et al. |
| D713,307 S | 9/2014 | Kanki |
| D716,203 S | 10/2014 | Nakai |
| D727,231 S | 4/2015 | Narita et al. |
| D727,816 S | 4/2015 | Takagi et al. |
| D731,937 S | 6/2015 | Masakawa et al. |
| D733,722 S | 7/2015 | Ueda |
| 9,090,282 B2 | 7/2015 | Salvini |
| D749,106 S | 2/2016 | Lisseman et al. |
| D758,932 S | 6/2016 | Schowalter |
| 9,409,538 B2 | 8/2016 | Gorman et al. |
| 9,421,993 B2 | 8/2016 | Spaggiari |
| D771,541 S | 11/2016 | Shouno et al. |
| 9,511,790 B2 | 12/2016 | Spaggiari |
| D775,563 S | 1/2017 | Shan |
| 9,550,514 B2 | 1/2017 | Schulz et al. |
| D778,796 S | 2/2017 | Gommier et al. |
| D786,758 S | 5/2017 | Chang et al. |
| D786,796 S | 5/2017 | Frye et al. |
| 9,650,009 B2 | 5/2017 | Bana et al. |
| D788,666 S | 6/2017 | Yamamoto et al. |
| D791,664 S | 7/2017 | Igarashi |
| D793,314 S | 8/2017 | Yoon et al. |
| D795,145 S | 8/2017 | Miyashita et al. |
| D795,146 S | 8/2017 | Ogawa et al. |
| D801,245 S | 10/2017 | Giolito |
| D803,249 S | 11/2017 | Masuda |
| D808,874 S | 1/2018 | Gao |
| D809,443 S | 2/2018 | Walker et al. |
| D810,643 S | 2/2018 | Takamura et al. |
| D811,296 S | 2/2018 | Cadalora et al. |
| D812,536 S | 3/2018 | Matsuda et al. |
| D813,127 S | 3/2018 | Yamamoto |
| D813,769 S | 3/2018 | Yaguchi |
| D817,832 S | 5/2018 | Maezono |
| D819,533 S | 6/2018 | Choi et al. |
| D820,285 S | 6/2018 | Haverinen et al. |
| D824,302 S | 7/2018 | Cadalora et al. |
| D824,306 S | 7/2018 | Joyce et al. |
| D824,826 S | 8/2018 | Cadalora et al. |
| D824,932 S | 8/2018 | Joensson et al. |
| D825,418 S | 8/2018 | Cadalora et al. |
| D825,420 S | 8/2018 | Boyes et al. |
| D826,117 S | 8/2018 | Cadalora et al. |
| D826,122 S | 8/2018 | Yamamoto |
| D826,813 S | 8/2018 | Carr et al. |
| D828,259 S | 9/2018 | Takagi |
| D828,260 S | 9/2018 | Takagi |
| D830,927 S | 10/2018 | Tanaka et al. |
| D836,510 S | 12/2018 | Nakai |
| 10,144,382 B2 | 12/2018 | Shanks et al. |
| D839,882 S | 2/2019 | Han et al. |
| D840,305 S | 2/2019 | Chang et al. |
| D847,176 S | 4/2019 | Zhong et al. |
| D848,449 S | 5/2019 | Rettew et al. |
| D855,641 S | 8/2019 | Lewis et al. |
| D870,748 S | 12/2019 | Jostrand |
| 10,520,074 B2 * | 12/2019 | Van Lieshout ......... F16H 57/12 |
| D872,109 S | 1/2020 | Folken et al. |
| D872,751 S | 1/2020 | Ziezold et al. |
| D873,278 S | 1/2020 | Nakahara et al. |
| 10,583,855 B2 | 3/2020 | Toddenroth |
| D899,328 S | 10/2020 | Roo-Clefas et al. |
| 2002/0047255 A1 | 4/2002 | Baume et al. |
| 2003/0001366 A1 | 1/2003 | Debler et al. |
| 2003/0164060 A1 * | 9/2003 | Menjak .................. B62D 1/105 |
| | | 74/552 |
| 2004/0154422 A1 * | 8/2004 | Menjak .................. B62D 1/105 |
| | | 74/440 |
| 2006/0213315 A1 * | 9/2006 | Faeth .................... B60R 16/027 |
| | | 74/552 |
| 2008/0092061 A1 | 4/2008 | Bankston et al. |
| 2009/0044999 A1 * | 2/2009 | Ridolfi .................. B60R 16/027 |
| | | 180/78 |
| 2009/0187335 A1 | 7/2009 | Muhlfelder et al. |
| 2009/0189373 A1 | 7/2009 | Schramm et al. |
| 2010/0123737 A1 | 5/2010 | Williamson et al. |
| 2012/0074674 A1 | 3/2012 | Ohoka et al. |
| 2013/0325481 A1 | 12/2013 | Van et al. |
| 2013/0345980 A1 | 12/2013 | Van et al. |
| 2015/0321551 A1 | 11/2015 | Hendry et al. |
| 2016/0001807 A1 | 1/2016 | Hans et al. |
| 2017/0072984 A1 | 3/2017 | Gong |
| 2018/0216716 A1 * | 8/2018 | Vann Lieshout ....... F16H 57/12 |
| 2019/0039550 A1 | 2/2019 | Eckert |
| 2019/0071055 A1 | 3/2019 | Luchner et al. |

(56) References Cited

U.S. PATENT DOCUMENTS

| | | | |
|---|---|---|---|
| 2019/0071112 A1 | 3/2019 | Toddenroth et al. | |
| 2019/0073111 A1 | 3/2019 | Luchner et al. | |

FOREIGN PATENT DOCUMENTS

| | | | |
|---|---|---|---|
| CN | 106926806 | A | 7/2017 |
| CN | 108045320 | A | 5/2018 |
| CN | 108583498 | A | 9/2018 |
| CN | 109131529 | A | 1/2019 |
| DE | 4225709 | A1 | 2/1994 |
| DE | 19858835 | A1 | 6/2000 |
| DE | 10145629 | A1 | 4/2003 |
| DE | 102010050699 | A1 | 8/2011 |
| DE | 102013102014 | A1 | 8/2014 |
| EP | 0825089 | A1 | 2/1998 |
| EP | 0983925 | A1 | 3/2000 |
| EP | 1042769 | A2 | 10/2000 |
| EP | 1249373 | A2 | 10/2002 |
| EP | 1669254 | A1 | 6/2006 |
| EP | 2033850 | A2 | 3/2009 |
| ES | 2206817 | T3 | 5/2004 |
| FR | 2506690 | A1 | 12/1982 |
| FR | 2814421 | A1 | 3/2002 |
| JP | 57-172879 | A | 10/1982 |
| JP | 2010-036882 | A | 2/2010 |
| KR | 98-0008956 | A | 4/1998 |
| WO | 99/33075 | A2 | 7/1999 |
| WO | 2019/025856 | A1 | 2/2019 |
| WO | 2019/048346 | A1 | 3/2019 |

OTHER PUBLICATIONS

Ex Parte Quayle Action received for U.S. Appl. No. 29/616,359, mailed on Mar. 7, 2019, 6 pages.

International Preliminary Reporton Patentability received for PCT Patent Application No. PCT/EP2018/073437, dated Mar. 19, 2020, 7 pages.

International Preliminary Reporton Patentability received for PCT Patent Application No. PCT/IB2018/000972, dated Feb. 13, 2020, 7 pages.

International Search Report and Written Opinion received for PCT Patent Application No. PCT/CN2020/077612, dated May 27, 2020, 7 pages.

International Search Report and Written Opinion received for PCT Patent Application No. PCT/EP2018/073437, dated Feb. 1, 2019, 8 pages.

International Search Report and Written Opinion received for PCT Patent Application No. PCT/IB2018/000972, dated Jan. 9, 2019, 9 pages.

Non-Final Office Action received for U.S. Appl. No. 15/669,693, dated Nov. 19, 2018, 15 pages.

Non-Final Office Action received for U.S. Appl. No. 15/696,143, dated Apr. 8, 2019, 21 pages.

Non-Final Office Action received for U.S. Appl. No. 29/639,449, dated Mar. 4, 2019, 15 pages.

Notice of Allowance received for U.S. Appl. No. 15/669,693, dated Aug. 26, 2019, 8 pages.

Notice of Allowance received for U.S. Appl. No. 15/669,693, dated May 1, 2019, 11 pages.

Notice of Allowance received for U.S. Appl. No. 15/696,143, dated Oct. 23, 2019, 7 pages.

Notice of Allowance received for U.S. Appl. No. 29/616,358, dated Jan. 16, 2020, 5 pages.

Notice of Allowance received for U.S. Appl. No. 29/616,358, dated May 11, 2020, 6 pages.

Notice of Allowance received for U.S. Appl. No. 29/616,358, dated Nov. 6, 2018, 6 pages.

Notice of Allowance received for U.S. Appl. No. 29/616,359, dated Feb. 10, 2020, 7 pages.

Notice of Allowance received for U.S. Appl. No. 29/616,359, dated May 26, 2020, 7 pages.

Notice of Allowance received for U.S. Appl. No. 29/616,359, dated Sep. 18, 2019, 6 pages.

Notice of Allowance received for U.S. Appl. No. 29/639,449, dated Jan. 17, 2020, 7 pages.

Notice of Allowance received for U.S. Appl. No. 29/639,449, dated Sep. 18, 2019, 8 pages.

Notice of Allowance received for U.S. Appl. No. 29/639,450, dated Dec. 10, 2018, 6 pages.

Office Action received for Korean Patent Application No. 9-5-2018-057335547, dated Aug. 22, 2018, 7 pages.

Notice of Allowance dated Sep. 8, 2021 from U.S. Appl. No. 29/616,358, 6 pages.

* cited by examiner

STEERING WHEEL WITH FIXED CENTER

TECHNICAL FIELD

The disclosed embodiments relate generally to vehicles and in particular, but not exclusively, to a vehicle steering wheel with a fixed center.

BACKGROUND

In most current vehicles the center of the steering wheel is used for an airbag and a small number of finger-operated controls. The finger operated controls are usually controls that can be operated intuitively without the user having to absorb much information. In part this is because the controls turn with the steering wheel, which makes it difficult for a driver to read and understand information associated with the controls.

Most information that a driver sees—navigation information, vehicle status information, entertainment information, etc.—is found on fixed displays on the vehicle's dashboard. But there is usually only limited space on the dashboard for such displays, and when they are on the dashboard they are not necessarily in the best position for driver viewing. The center of the steering wheel is a position that is very visible to the driver, but displays have not traditionally been put there because they would rotate whenever the steering wheel is turned. The effect has been to render a prime location unusable because a readable display orientation could not be maintained.

SUMMARY

Embodiments are disclosed of an apparatus including a housing. A column gear is positioned within the housing and adapted to be coupled to a steering column, and the column gear has a first diameter, rotates about a first axis, and has teeth along its perimeter. A steering wheel gear is positioned within the housing and spaced apart from the column gear and adapted to be coupled to a steering wheel; the steering wheel gear has a second diameter, rotates about a stationary hub having a second axis, and has teeth along its perimeter. A transfer gear is positioned within the housing. The transfer gear rotates about a third axis, has teeth along its perimeter, and is positioned so that the teeth of the transfer gear engage the teeth of the column gear and the teeth of the steering wheel gear.

Embodiments are disclosed of a system including a vehicle. A steering assembly is positioned in the vehicle. The steering assembly includes a housing and a column gear positioned within the housing and adapted to be coupled to a steering column. The column gear has a first diameter, rotates about a first axis, and has teeth along its perimeter. A steering wheel gear is also positioned within the housing and spaced apart from the column gear and adapted to be coupled to a steering wheel; the steering wheel gear has a second diameter, rotates about a stationary hub having a second axis, and has teeth along its perimeter. A transfer gear is also positioned within the housing. The transfer gear rotates about a third axis, has teeth along its perimeter, and is positioned so that the teeth of the transfer gear engage the teeth of the column gear and the teeth of the steering wheel gear. A steering wheel coupled to the steering wheel gear by a steering wheel hub retainer that surrounds the stationary hub, and a display coupled to the stationary hub so that the display is positioned substantially in the middle of the steering wheel and wherein the display is stationary and the steering wheel rotates around the display.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1A shows the steering wheel in one position and FIG. 1B shows the steering wheel rotated to a different position while a display positioned in the center of the steering wheel remains in the same orientation.

FIG. 2A is a plan view, FIG. 2B a cross-sectional view taken substantially along section line B-B in FIG. 2A.

DETAILED DESCRIPTION

Embodiments are disclosed of a steering assembly that allows the steering wheel of a vehicle to be turned while a center of the steering wheel remains stationary. This is useful in applications where a display, or some other component that must be viewed by a driver, is positioned in the center of the steering wheel. The display can be coupled to the center so that it too remains stationary, making it substantially easier for the driver to see what is shown on the display even while turning the vehicle's steering wheel. The steering assembly can also be sealed to prevent the entry of dust, liquid, or other debris that could adversely affect steering functions.

The steering assembly includes a system of gears. A steering wheel gear revolves around a stationary hub and is coupled to a steering wheel, a column gear is coupled to a steering column, and a transfer gear transfers rotation and torque from the steering wheel gear the column gear. This, the steering assembly uses a combination of gears to transmit steering commands from the steering wheel to the vehicle's steering system. And because the steering assembly includes a stationary hub, a display can be coupled to the stationary hub to that it remains stationary while the steering wheel turns.

Figure 1A:
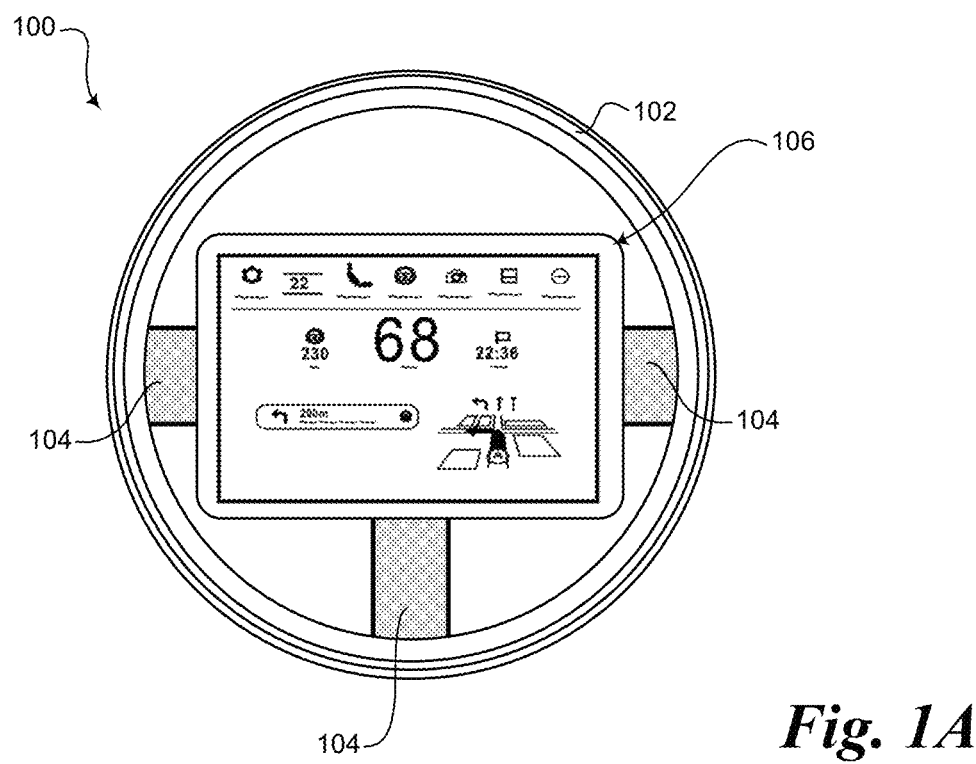
FIGS. 1A-1B are drawings of an embodiment of a steering wheel with a fixed center.
Figure 1B:
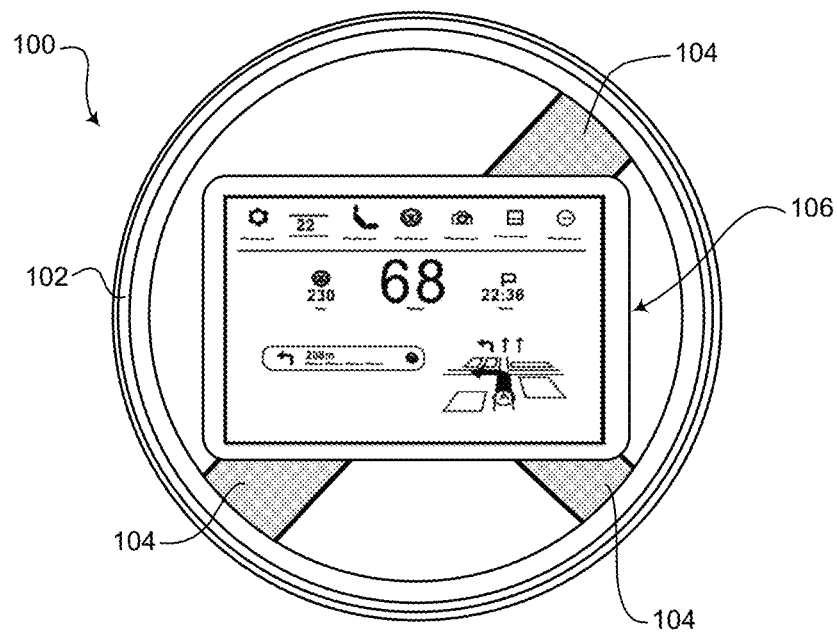

FIGS. 1A-1B together illustrate an embodiment of a steering wheel 100 with a fixed center. FIG. 1A shows steering wheel 100 in a first position, while FIG. 1B shows steering wheel 100 rotated to a second position. Steering wheel 100 includes a substantially circular grip 102 that is coupled to a central steering wheel hub (not shown in these figures, but see FIG. 2B) by a plurality of spokes 104. The central hub of the steering wheel and a display 106, which in one embodiment is an electronic display but in other embodiments can be something else, are coupled to a steering assembly (see FIG. 2A et seq.), that allows the steering wheel grip 102 and spokes 104 to be turned while display 106 remains fixed—i.e., it remains in the same orientation—as shown in FIG. 1B. Because display 106 remains in the same orientation, even if the steering wheel is turned a driver can clearly read display 106 even while steering the vehicle.

Figure 2A:
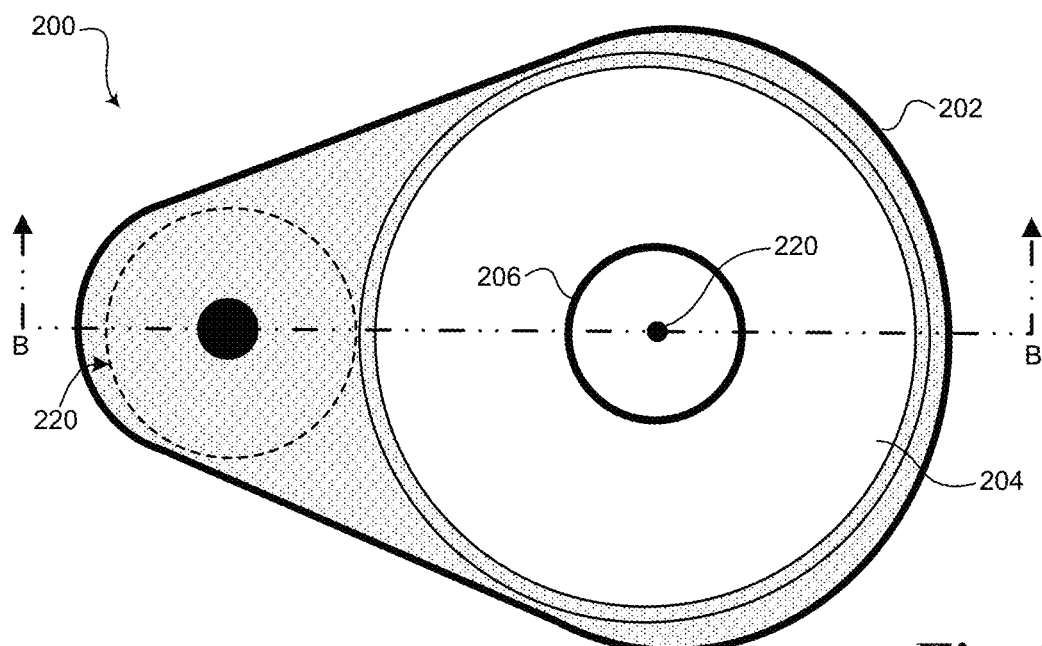
FIGS. 2A-2B are drawings of an embodiment of a steering assembly that allows a center of the steering wheel to remain fixed.
Figure 2B:
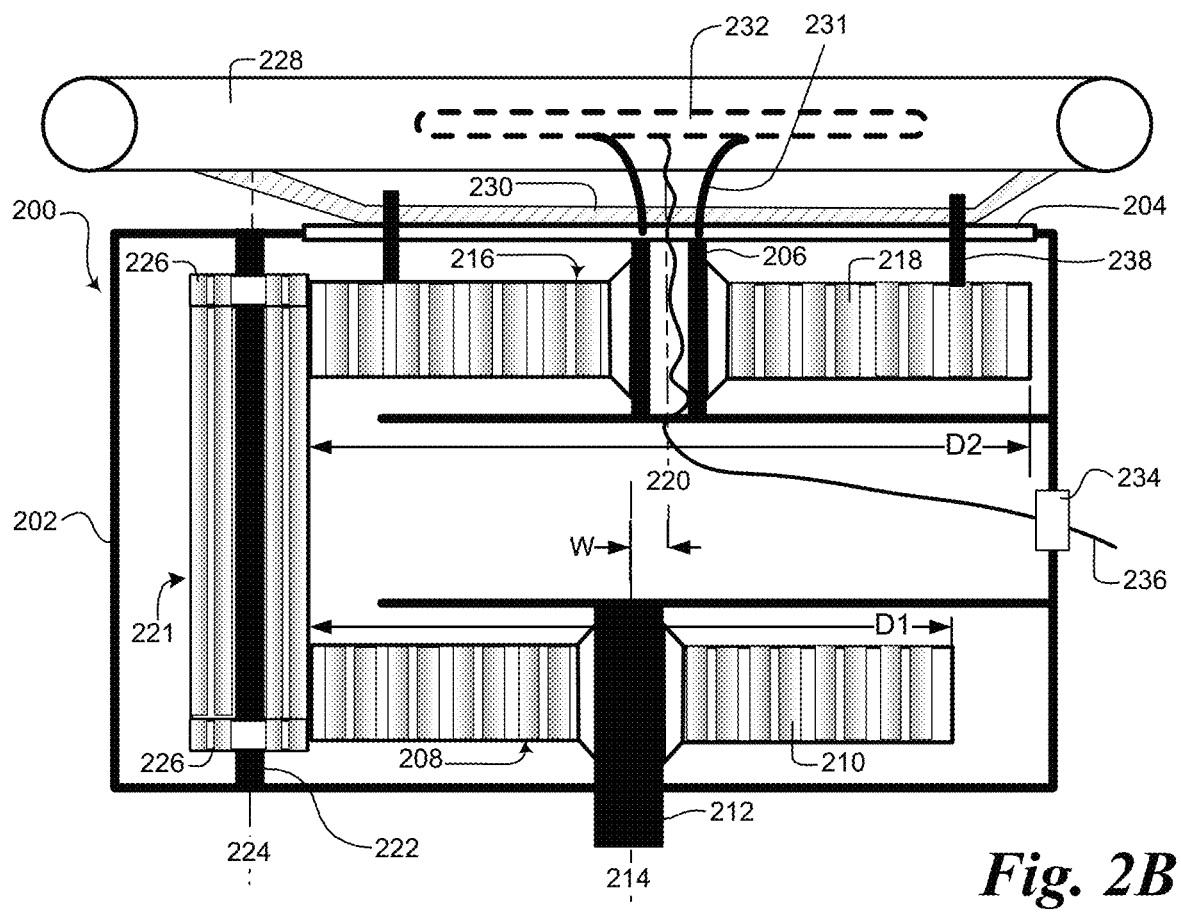

FIGS. 2A-2B illustrate an embodiment of a steering assembly 200 allows a center portion of the steering wheel to remain fixed while the rest of the steering wheel turns, as shown in FIGS. 1A-1B. FIG. 2A is a top view, FIG. 2B a cross-sectional view.

Housing 202 encloses and surrounds the other elements of steering assembly 200. The top part of housing 202 can have an opening designed to receive a steering wheel hub retainer 204. In one embodiment, wheel hub retainer 204 can be coupled to housing 202 in such a way that the interior the housing is sealed. Housing 202 also includes a sealed opening 234. One or more wires 236 can be inserted into the interior of housing 202 through sealed opening 234 so that the wires can be used to provide electrical power, data, or both electrical power and data, to a display 232 positioned substantially in the center of a steering wheel 228. Housing 202 can thus be sealed to prevent entry of liquids, dirt, or other debris that could cause the gears went other mechanisms within to wear prematurely or malfunction.

In the interior of housing 202 is a system of gears that can transfer rotation and torque from steering wheel 228 to a steering column or shaft 212. The system of gears within housing 202 includes a column gear 208, a steering wheel gear 216, and a transfer gear 221. Column gear 208 is fixed to a steering column 212 so that rotation of column gear 208 also produces rotation of steering column 212. Steering column 212, and hence gear 208, rotates about axis 214. Column gear 208 has a diameter D1 and has teeth 210 along its perimeter, although in other embodiments gears with other types of teeth, and other positioning of teeth, can also be used.

Steering wheel gear 216 is rotatably coupled to a stationary hub 206 so that when steering wheel gear 216 rotates around stationary hub 206 the stationary hub will remain stationary. In one embodiment, steering wheel gear 216 can be rotatably coupled to stationary hub 206 by a bearing (not shown), but in other embodiments can be rotatably coupled differently. Steering wheel gear 216 has a diameter D2 and has teeth 218 around its perimeter, although other embodiments can have different teeth with a different positioning than shown. Stationary hub 206 can be formed as part of housing 202 and has an axis 220, as a result of which axis 220 is also the axis of rotation of steering wheel gear 216. In one embodiment axes 214 and 220 are parallel to each other and separated by nonzero distance W, so that column gear 208 and steering wheel gear 216 are offset from each other. But in other embodiments distance W can be substantially zero, so that axes 214 and 220 are collinear. Generally the value of distance W will depend, among other things, on the values of gear diameters D1 and D2.

Transfer gear 221 rotates about a shaft or axle 222 that has an axis 224. Axis 224 is parallel to, but offset from, axes 214 and 220. The ends of axle 222 are attached to the interior of housing 202 and transfer gear 221 is rotatably coupled to axle 222, for example by a bearing (not shown in this drawing, but see FIGS. 3-4). Transfer gear 221 is positioned so that its teeth correspond with, and engage with, the teeth of column gear 208 and steering wheel gear 216. Transfer gear 221 has scissors gears 226 at each end. Scissors gears 226 also rotate about axle or shaft 222 and a torsional spring is positioned between scissors gears 226 and transfer gear 221 (not shown in this figure, but see FIGS. 3-4). In one embodiment, the torsional spring is a torsional disk spring, but in other embodiments it can be another type of spring. The torque applied by the torsional disk spring between the scissors gears and the transfer gear reduces or prevents backlash in the gear train made up of column gear 208, steering wheel gear 216, and transfer gear 221.

Outside housing 202, a steering wheel hub 230 can be attached to steering wheel hub retainer 204. Steering wheel hub 230 is coupled to a collar 238 projecting from steering wheel gear 216, so that torque and rotation of the steering wheel can be transmitted to gear 216. A display 232 can positioned can be positioned in the center of steering wheel 228 and coupled to stationary hub 206 by a stem or other implement 231.

In operation of steering assembly 200, steering wheel 228, when turned by user, causes steering wheel gear 216 to turn. Because the teeth of steering wheel gear 216 engage the teeth of transfer gear 221 and the teeth of transfer gear 221 in turn engage the teeth of column gear 208, rotation of steering wheel gear 216 rotates transfer gear 221, which in turn rotates column gear 208 and, correspondingly, steering column 212. Steering assembly 200 thus transmits rotation of the steering wheel to the steering column 212 and to the vehicle's steering system. At the same time, display 232, being fixed by stem 231 to stationary hub 206, does not turn with the turning of steering wheel 228, but instead remains at the same orientation so that it can be more easily viewed by a user.

Figure 3:
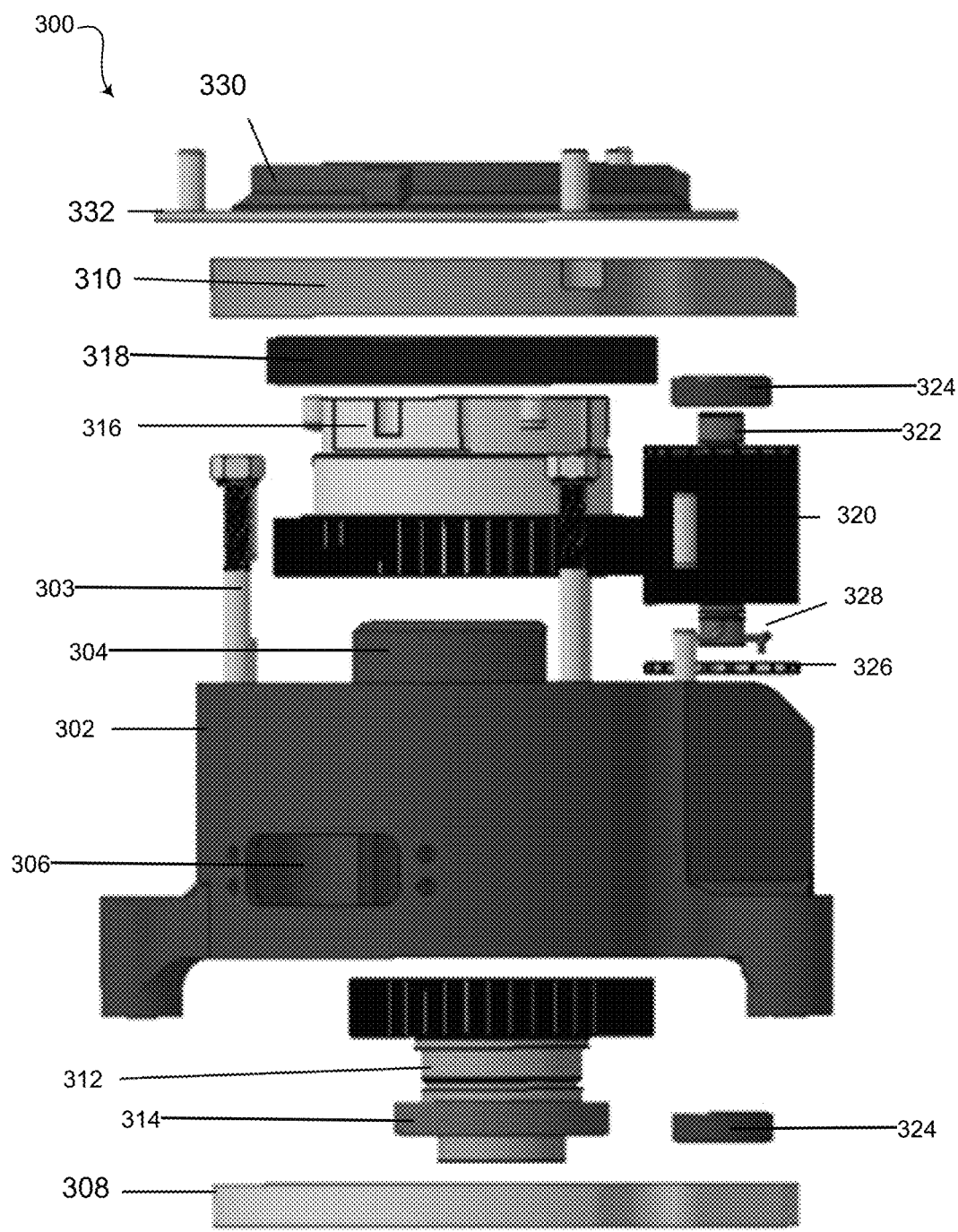
FIG. 3 is an exploded drawing of an embodiment of a steering assembly that allows a center of the steering wheel to remain fixed.

FIG. 3 illustrates an embodiment of a steering assembly 300. Most of the exterior of assembly 300 is formed by housing 302, which encloses and surrounds the other elements. Housing 302 is closed off by a lower mount plate 308 and an upper mount plate 310, both of which are fixed to housing 302 using bolts 303. Upper mount plate 310 has an opening therein (not visible in this drawing) through which a collar of steering wheel gear 316 extends, so that the steering wheel hub 330 can be coupled to the steering wheel gear. Lower mount plate 308 has an opening therein through which a part of column gear 312 extends, so that a steering column can be coupled to the column gear. Opening 306 on the side of housing 302 allows one or more wires to be inserted into the housing and through stationary hub 304, steering wheel gear 316, and other components to a display that can be positioned in the center of a steering wheel (see, e.g., FIG. 2B).

Inside housing 302 is a system of gears that transfer rotation and torque from a steering wheel to a steering column or shaft. The system of gears includes a column gear 312, a steering wheel gear 316, and a transfer gear 320. Column gear 312 can be fixed to a steering column (not shown) so that rotation of the column gear also rotates the steering column. A column bearing 314 is positioned between the column gear 312 and lower mount plate 308 to allow smooth rotation of the gear relative to the mount plate.

Steering wheel gear 316 is rotatably coupled to stationary hub 304 so that it rotates around stationary hub 304 while the stationary hub remains stationary. Stationary hub 304 can be formed as part of housing 302. In the illustrated example, an interior of steering wheel gear 316 can be rotatably coupled to stationary hub 304 by an outside bearing 318 (referred to as an outside bearing because it is on the outer side of the collar of steering wheel gear 316), but in other embodiments the rotational coupling can be done differently. A steering wheel gear bearing 318 is positioned between steering wheel gear 316 and upper mount plate 310 to allow smooth rotation of the steering wheel gear relative to the upper mount plate.

Transfer gear 320 rotates about a shaft or axle 322 whose ends are attached to the interior of housing 202. In the illustrated embodiment transfer gear 320 is rotatably coupled to axle 222 by one or more bearings 324, but in other embodiments the rotational coupling can be done differently. Transfer gear 320 is positioned so that its teeth engage with the teeth of column gear 312 and the teeth of steering wheel gear 316. Transfer gear 320 has scissors gears 326 positioned at each end. Scissors gears 326 also rotate about axle or shaft 322, and a torsional spring is positioned between scissors gears 326 and transfer gear 320. A torsional spring 328 is positioned between each scissors gear and the transfer gear. In one embodiment, torsional spring 328 can be a torsional disk spring, but in other embodiments torsional spring 328 can be a different kind of spring. The torque applied by the torsional disk spring 328 between the scissors gears and the transfer gear reduces or prevents backlash in the gear train.

Outside housing 302, a steering wheel hub 330 can be coupled to upper mount plate 310 via a steering wheel hub retainer 332, Steering wheel hub 330 is coupled to steering wheel gear 316 by one or more corresponding notches, so that torque from the steering wheel can be transmitted to steering wheel gear 316, thus causing it to rotate. Steering assembly 300 operates similarly to steering assembly 200.

Figure 4:
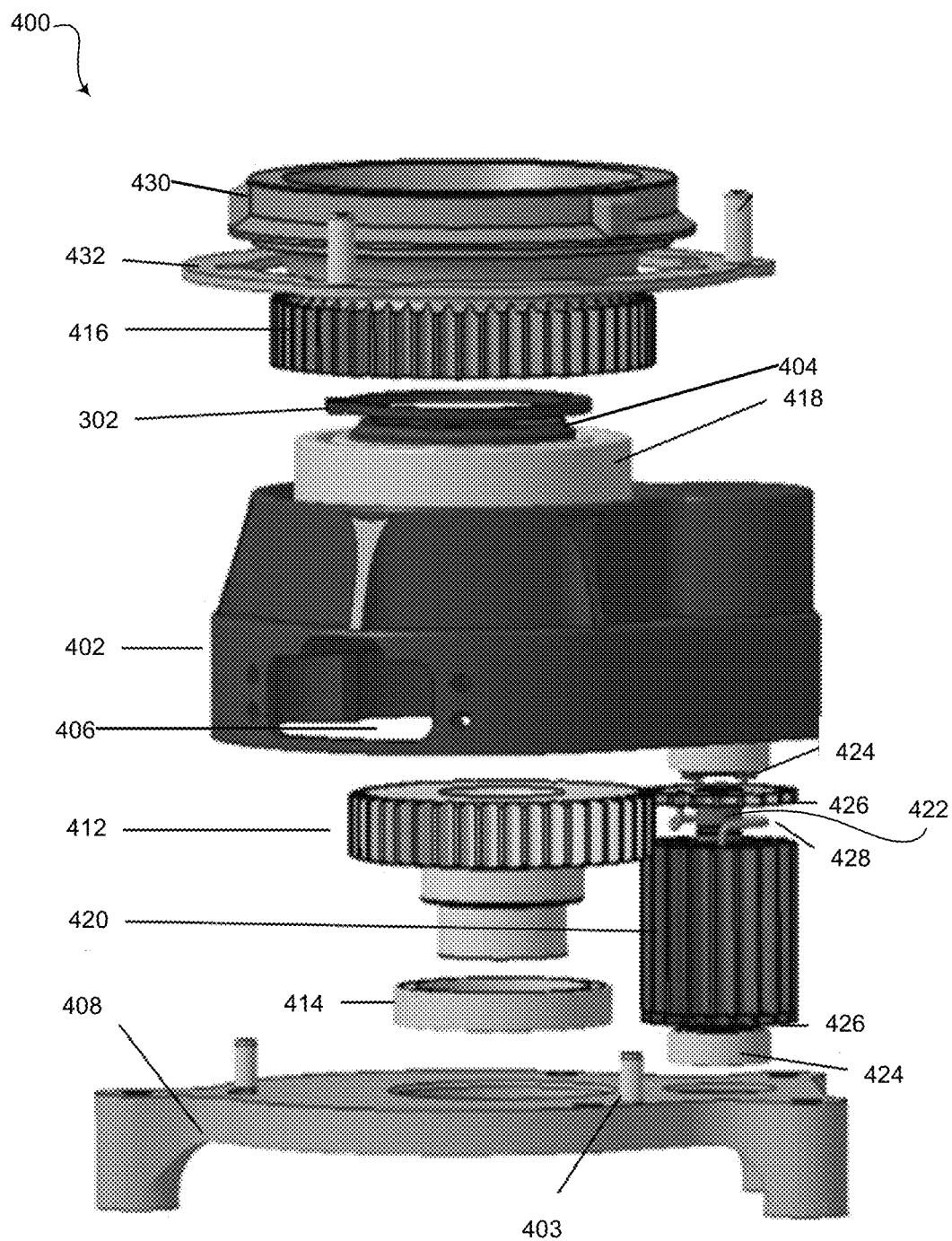
FIG. 4 is an exploded drawing of another embodiment of a steering assembly that allows a center of the steering wheel to remain fixed.

FIG. 4 illustrates an embodiment of a steering assembly 400. Most of the exterior of assembly 400 is formed by housing 402, which encloses and surrounds the other elements. Housing 402 is closed off by a steering hub retainer 432 and by a lower mount plate 408 fixed to housing 402 using bolts 403. Steering hub retainer 432 has an opening through which a collar of steering wheel gear 416 extends, so that a steering wheel hub 430 can be coupled to the steering wheel gear 416. Lower mount plate 408 has an opening therein through which a part of column gear 412 extends, so that a steering column can be coupled to the column gear. Opening 406 on the side of housing 402 allows one or more wires to be inserted into the housing and through stationary hub 404, steering wheel gear 416, and other components to a display that can be positioned in the center of a steering wheel (see, e.g., FIG. 2B).

Inside housing 402 is a system of gears that transfer rotation and torque from a steering wheel to a steering column or shaft. The system of gears includes a column gear 412, a steering wheel gear 416, and a transfer gear 420. Column gear 412 can be fixed to a steering column (not shown) so that rotation of the column gear also rotates the steering column. A column bearing 414 is positioned between the column gear 412 and lower mount plate 408 to allow smooth rotation of the gear relative to the mount plate.

Steering wheel gear 416 is rotatably coupled to stationary hub 404 so that it rotates around stationary hub 404 while the stationary hub remains stationary. Stationary hub 404 can be formed as part of housing 402. In the illustrated example, an interior of steering wheel gear 416 can be rotatably coupled to stationary hub 404 by an inside bearing 418 (referred to as an inside bearing because it fits on the inside of the collar of steering wheel gear 416), but in other embodiments the rotational coupling can be done differently.

Transfer gear 420 rotates about a shaft or axle 422 whose ends are attached to the interior of housing 202. In the illustrated embodiment transfer gear 420 is rotatably coupled to axle 222 by one or more bearings 424, but in other embodiments the rotational coupling can be done differently. Transfer gear 420 is positioned within housing 402 so that its teeth engage with the teeth of column gear 412 and the teeth of steering wheel gear 416. Transfer gear 420 has scissors gears 426 positioned at each end. Scissors gears 426 also rotate about axle or shaft 422, and a torsional spring is positioned between scissors gears 426 and transfer gear 420. A torsional spring 428 is positioned between each scissors gear and the transfer gear. In one embodiment, torsional spring 428 can be a torsional disk spring, but in other embodiments torsional spring 428 can be a different kind of spring. The torque applied by the torsional disk spring 428 between the scissors gears and the transfer gear reduces or prevents backlash in the gear train.

Outside housing 402, a steering wheel hub 430 can be coupled to steering wheel gear 416 by steering wheel hub retainer 432, Steering wheel hub 430 is coupled to steering wheel gear 416 by one or more corresponding notches, so that torque from the steering wheel can be transmitted to steering wheel gear 416, thus causing it to rotate. Steering assembly 400 operates similarly to steering assembly 300.

Figure 5:
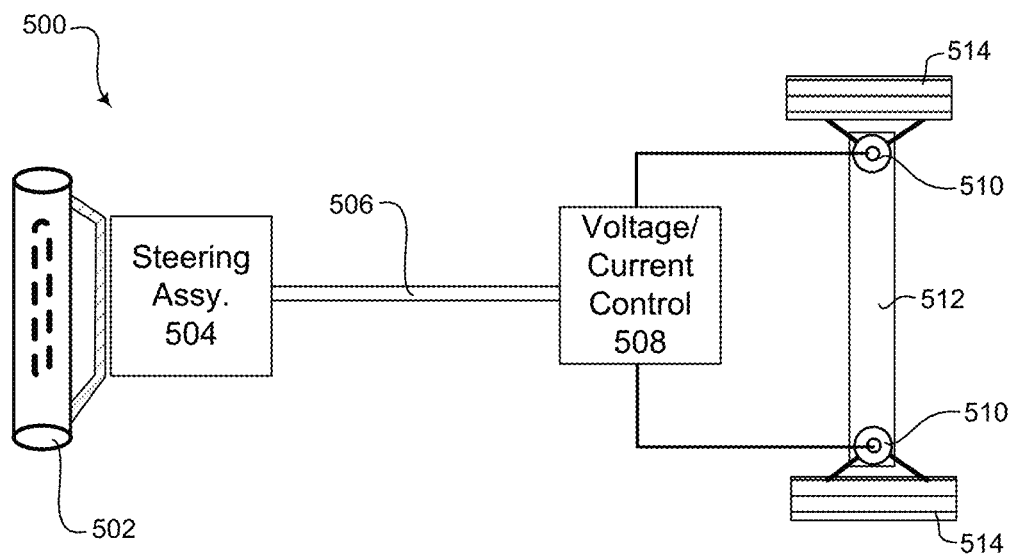
FIG. 5 is a schematic view of an embodiment of a steering system using a steering assembly such as the ones shown in FIGS. 3-4.

FIG. 5 illustrates an embodiment of an electrical steering system 500. System 500 includes a steering wheel 502 that is coupled to a steering assembly 504. In one embodiment steering assembly 504 can be any of steering assemblies 200, 300, or 400. Steering column 506 is also coupled to steering assembly 504, so that steering assembly 504 converts rotation of steering wheel 502 into rotation of steering column 506 while keeping stationary a display positioned in the middle of the steering wheel, all as previously described.

Steering column 506 is coupled to a controller 508 that can be a voltage controller, a current controller, or both a voltage and current controller. In one embodiment controller 508 can be a rheostat, but in other embodiments it can be a different controller, such as a digital controller. Controller 508 has outputs that direct current to steering motors 510. Steering motors 510 are attached to a vehicle frame 512 and also to wheels 514. In operation, controller 508, in response to rotation of steering column 506, regulates the voltage and/or current directed to steering motors 510, thus rotating wheels 514 and steering the vehicle.

Figure 6:
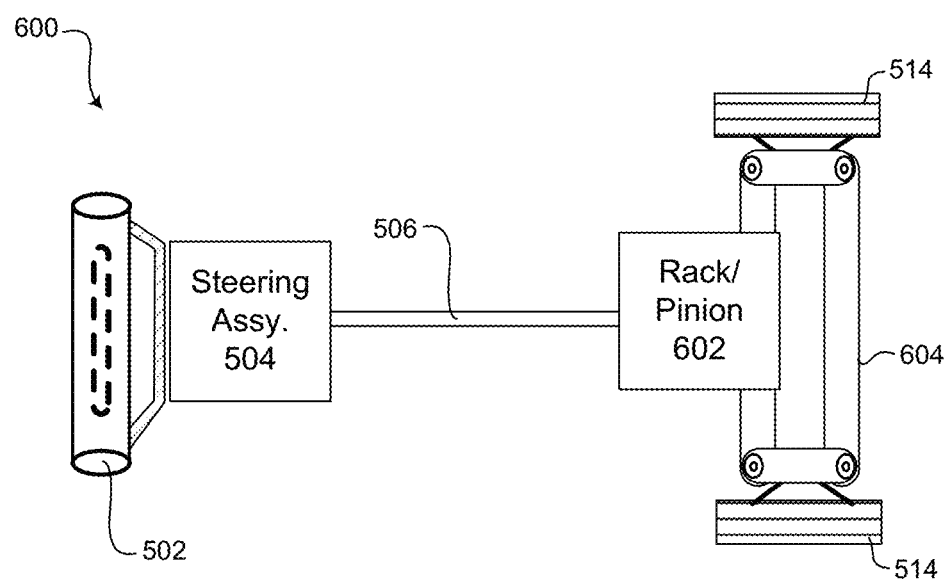
FIG. 6 is a schematic view of another embodiment of a steering system using a steering assembly such as the ones shown in FIGS. 3-4.

FIG. 6 illustrates an embodiment of a mechanical steering system 600. System 600 is in most respects similar to system 500. System 600 includes a steering wheel 502 that is coupled to a steering assembly 504. In one embodiment steering assembly 504 can be any of steering assemblies 200, 300, or 400. Steering column 506 is also coupled to steering assembly 504, so that steering assembly 504 converts rotation of steering wheel 502 into rotation of steering column 506 while keeping stationary a display positioned in the middle of the steering wheel, all as previously described.

The primary difference between systems 500 and 600 is that in system 600 the steering mechanism to which steering column 506 is coupled is mechanical instead of electrical. In the illustrated embodiment steering column 506 is coupled to rack and pinion mechanism 602; in other embodiments mechanism 602 can, of course, be another type of mechanism. Rack and pinion mechanism 602 is coupled to steering mechanism 604, which in turn is coupled to wheels 514. In the illustrated embodiment steering mechanism 604 is a four-bar linkage, but in other embodiments it can be a different mechanism. In operation, in response to rotation of steering column 506 rack and pinion mechanism 602 drives steering mechanism 604, thus rotating wheels 514 and steering the vehicle.

The above description of embodiments is not intended to be exhaustive or to limit the invention to the described forms. Specific embodiments of, and examples for, the invention are described herein for illustrative purposes, but various modifications are possible.

The invention claimed is:

1. An apparatus comprising:
   a housing having a lower end, an upper end, and a stationary hub formed as part of the housing;
   a column gear positioned within the housing and adapted to be fixed to a steering column, wherein the column gear has a first diameter, rotates about a first axis, and has teeth along its perimeter;
   a steering wheel gear positioned within the housing and spaced apart from the column gear and adapted to be coupled to a steering wheel, wherein the steering wheel gear has a second diameter, is rotatably coupled to the stationary hub, rotates about a second axis, and has teeth along its perimeter; and
   a single transfer gear positioned within the housing, wherein the single transfer gear has teeth along its perimeter and rotates about an axle attached to an interior of the housing and parallel to and spaced apart from the first and second axes, wherein the single transfer gear is positioned so that the teeth of the single transfer gear engage the teeth of the column gear and the teeth of the steering wheel gear.

2. The apparatus of claim 1 wherein the transfer gear includes one or more scissors gears to reduce or prevent backlash.

3. The apparatus of claim 2 wherein each of the one or more scissors gears include a gear that rotates about the third axis and a spring to apply a torque about the third axis to the scissors gear.

4. The apparatus of claim 1 wherein the first diameter and the second diameter are substantially equal.

5. The apparatus of claim 1 wherein the stationary hub has a hollow center.

6. The apparatus of claim 5 wherein the housing has a sealable opening so that wires can be fed through the sealable opening and through the hollow center of the stationary hub.

7. The apparatus of claim 1, further comprising a steering wheel coupled to the steering wheel gear by a steering wheel hub retainer that surrounds the stationary hub.

8. The apparatus of claim 1 wherein the lower end of the housing is closed off by a lower mounting plate, the lower mounting plate having an opening therein to allow a part of the column gear to extend outside the housing through the lower mounting plate.

9. The apparatus of claim 8 wherein the upper end of the housing is closed off by a steering wheel hub retainer or an upper mounting plate, and wherein the steering wheel hub retainer and the upper mounting plate have openings therein to allow a part of the steering wheel gear and a part of the stationary hub to extend outside the housing.

10. A system comprising:
    a vehicle;
    a steering assembly positioned in the vehicle, the steering assembly comprising:
      a housing having a lower end, an upper end, and a stationary hub formed as part of the housing,
      a column gear positioned within the housing and adapted to be fixed to a steering column, wherein the column gear has a first diameter, rotates about a first axis, and has teeth along its perimeter,
      a steering wheel gear positioned within the housing and spaced apart from the column gear and adapted to be coupled to a steering wheel, wherein the steering wheel gear has a second diameter, is rotatably coupled to the stationary hub, rotates about a second axis, and has teeth along its perimeter, and
      a single transfer gear positioned within the housing, wherein the single transfer gear has teeth along its perimeter and rotates about an axle attached to an interior of the housing and parallel to and spaced apart from the first and second axes, wherein the single transfer gear is positioned so that the teeth of the single transfer gear engage the teeth of the column gear and the teeth of the steering wheel gear;
    a steering wheel coupled to the steering wheel gear by a steering wheel hub retainer that surrounds the stationary hub; and
    a display coupled to the stationary hub so that the display is positioned substantially in the middle of the steering wheel and wherein the display is stationary and the steering wheel rotates around the display.

11. The system of claim 10 wherein the transfer gear includes one or more scissors gears to reduce or prevent backlash.

12. The system of claim 11 wherein each of the one or more scissors gears include a gear that rotates about the third axis and a spring to apply a torque about the third axis to the scissors gear.

13. The system of claim 10 wherein the first diameter and the second diameter are substantially equal.

14. The system of claim 10 wherein the stationary hub has a hollow center.

15. The system of claim 14 wherein the housing has a sealable opening so that wires can be fed through the sealable opening and the hollow center of the stationary hub to provide electrical power, data, or both electrical power and data to the display.

16. The system of claim 10, further comprising:
    a vehicle steering mechanism coupled to the steering column; and
    one or more vehicle wheels coupled to the vehicle steering mechanism.

17. The system of claim 16 wherein the vehicle steering mechanism steers the one or more vehicle wheels electrically.

18. The system of claim 16 wherein the vehicle steering mechanism steers the one or more vehicle wheels mechanically.

19. The system of claim 10 wherein the lower end of the housing is closed off by a lower mounting plate, the lower mounting plate having an opening therein to allow a part of the column gear to extend outside the housing.

20. The system of claim 19 wherein the upper end of the housing is closed off by a steering wheel hub retainer or an upper mounting plate, and wherein the steering wheel hub retainer and the upper mounting plate have openings therein to allow a part of the steering wheel gear and a part of the stationary hub to extend outside the housing.

* * * * *